Patented July 16, 1940

2,208,326

UNITED STATES PATENT OFFICE 2,208,326

ACCELERATOR OF VULCANIZATION

Joy G. Lichty, Stow, Ohio, assignor to Wingfoot Corporation, Wilmington, Del., a corporation of Delaware No Drawing. Application September 23, 1936, Serial No. 102,249

10 Claims. (Cl. 260—795)

This invention relates to accelerators for the vulcanization of rubber. More particularly, it relates to the amino hydroxy propanes.

These new accelerators may be prepared by reacting ammonia or certain primary amines with the halogen hydrins of propane. These halogen hydrins include the halogen hydrins of glycerine as well as the mono halogen mono hydroxy compounds. The seven possible types of these compounds are represented by the following formulae:

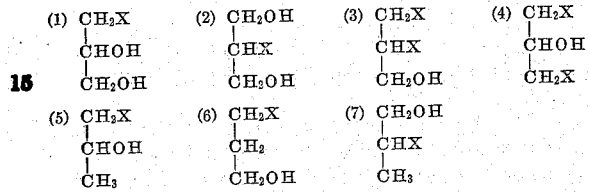

In the foregoing formulae, X is usually chlorine but may be any halogen.

When the chlorhydrins are treated with ammonia, each chlorine atom is replaced by an amino group and hydrochloric acid is released. This free acid may be caused to react with caustic soda, sodium carbonate, or any other acid absorbent, or may react with an excess of ammonia.

Certain primary amines may also be used in the practice of the invention. These amines include the primary aliphatic amines, either straight chain, branched chain, or cyclic, and the substituted primary aliphatic amines such as the aralkyl amines. Representative of these amines are methyl amine, ethyl amine, the propyl amines, the butyl amines, the amyl amines, etc., allyl amine and other unsaturated primary aliphatic amines, benzyl amine, furfurylamine, tetrahydrofurfuryl amine, cyclohexylamine, ring substituted cyclohexylamines, and the ac-tetrahydronaphthylamines. Also included are the primary poly amines, such as ethylene diamine, the poly ethylene polyamines, propylene diamine, cyclohexylene diamine, etc.

One specific compound coming within the invention is 1-amino-2,3-dihydroxy propane. It may be prepared as follows:

A solution of 100 grams of 1-chloro-2,3-dihydroxy propane and 40 grams of sodium hydroxide in 400 cc. of water and 1010 grams of 28% aqueous ammonium hydroxide was maintained at 15–20° C. for five hours. The excess of ammonia and the water were then removed by distillation under reduced pressure. The residue was treated with methyl alcohol and filtered to remove the sodium chloride. Distillation of the filtrate gave 52.3 grams of 1-amino-2,3-dihydroxy propane boiling between 120 and 140 degrees C. at 2 mm. pressure. There was a 23 gram residue of condensed or polymerized materials left from the distillation. Redistillation of the first mentioned fraction gave a product boiling at 125–128° C.

Diamino propanol (2), which is another specific compound within the invention, may be prepared as follows:

A solution consisting of 3212 grams of 26% ammonium hydroxide and 1000 cc. of water was cooled and stirred during the slow addition of 180 grams of sodium hydroxide pellets. To this were added 258 grams of dichloro propanol (2) and the temperature maintained at 15–20° C. for three hours. The excess ammonia and most of the water were distilled off under reduced pressure. The residue was treated with 400 cc. of methyl alcohol and the sodium chloride removed by filtration. The alcoholic filtrate was distilled under reduced pressure to remove the solvent. There was a 216.6 gram residue, which, according to the nitrogen determination, contained 127 grams of diamino propanol. When a 64.5 gram portion of this was distilled under reduced pressure the following fractions were obtained:

|  | Grams |
|---|---|
| B. P. 80–99° C./3–4 mm | 3.5 |
| B. P. 99–124° C./3–4 mm | 24.5 |
| Residue (condensed prods) | 36.5 |

The intermediate fraction boiling between 99 and 124 degrees C. at 3–4 mm. pressure showed, on analysis, 29.37% nitrogen. The calculated value for diamino propanol (2) is 31.10%.

It is not necessarily always desirable to isolate the particular compounds as in the preceding examples. The condensed residues resulting from the reaction are amine products which often possess desirable properties as vulcanization accelerators. Therefore, in some instances, it may be preferable to use the heterogeneous reaction product without attempting to greatly purify it.

In carrying out the reaction, it is usually desirable to keep the temperature low (as indicated in the examples). However, particularly when the amines are used instead of ammonia, it may become desirable to use more elevated temperatures.

The chlor hydrins in the examples may be replaced by any of the other chlor hydrins. Also, the chlor hydrins may be replaced by the corresponding brom hydrins or other halogen hydrins. However, the glycerol halogen hydrins are the preferred compounds. Also, any of the types of primary amines previously described may be employed instead of ammonia.

Thus an extremely large group of compounds come within the scope of the invention.

The compounds of the invention may be employed as accelerators in most of the ordinary rubber formulae. However, the following is one specific formula in which they have been found by test to yield excellent results.

| | Parts by weight |
|---|---|
| Rubber (extracted pale crepe) | 100 |
| Zinc oxide | 5 |
| Sulphur | 3 |
| Stearic acid | 1.5 |
| Accelerator | 0.5 |

Representative materials of the invention, when incorporated into rubber samples according to the above formula, vulcanized and tested, gave the following results:

| Time in mins. at ° F. | Ult. Tens. kgs./cm.$^2$ | Modulus in kgs./cm.$^2$ | | Ult. elg. in percent |
|---|---|---|---|---|
| | | 500% | 700% | |
| DIAMINO PROPANOL (2) | | | | |
| 10/260 | 60 | 8 | 19 | 925 |
| 20 | 110 | 10 | 28 | 950 |
| 40 | 145 | 13 | 47 | 900 |
| 60 | 170 | 16 | 60 | 875 |
| 80 | 176 | 18 | 75 | 840 |
| 60/285 | 200 | 30 | 125 | 775 |

| Time in mins. at ° F. | Ult. tens., kgs./cm.$^2$ | Modulus in kgs./cm.$^2$ | | Ult. elg. in percent |
|---|---|---|---|---|
| | | 500— | 700— | |
| 1-AMINO-2, 3-DIHYDROXY PROPANE | | | | |
| 40/285 | 83 | 11 | 29 | 890 |
| 60 | 108 | 12 | 33 | 910 |
| 80 | 101 | 14 | 43 | 950 |
| 120 | 114 | 15 | 43 | 870 |

From these data it is apparent that the compounds of the invention are very good vulcanization accelerators, producing products of good physical properties in adequately short times.

Although only the preferred form of the invention has been described in detail, it will be apparent to those skilled in the art that various modifications may be made therein without departing from the spirit of the invention or the scope of the appended claims. It is intended that the patent shall cover, by suitable expression in the appended claims, whatever features of patentable novelty reside in the invention.

What I claim is:

1. The method of treating rubber which comprises vulcanizing it in the presence of 1-amino 2,3-dihydroxy propane.

2. The method of treating rubber which comprises vulcanizing it in the presence of diamino-propanol (2).

3. The method of treating rubber which comprises vulcanizing it in the presence of a di(primary amino) propanol.

4. The method of treating rubber which comprises vulcanizing it in the presence of a primary amino dihydroxy propane.

5. A rubber product which has been vulcanized in the presence of a di(primary amino) propanol.

6. A rubber product which has been vulcanized in the presence of a primary amino dihydroxy propane.

7. A rubber product which has been vulcanized in the presence of 1-amino-2,3-dihydroxy propane.

8. A rubber product which has been vulcanized in the presence of diamino propanol (2).

9. The method of treating rubber which comprises vulcanizing it in the presence of a primary amino hydroxy propane.

10. A rubber product which has been vulcanized in the presence of a primary amino hydroxy propane.

JOY G. LICHTY.